United States Patent
Boni et al.

(10) Patent No.: US 7,237,326 B2
(45) Date of Patent: Jul. 3, 2007

(54) DEVICE FOR APPLYING BALANCING WEIGHTS TO VEHICLE WHEELS IN WHEEL BALANCING MACHINES

(75) Inventors: Dido Boni, Reggio Emilia (IT); Marco Montanari, Campegine (IT)

(73) Assignee: Sicam S.R.L., Correggio (IT)

( * ) Notice: Subject to any disclaimer, the term of this patent is extended or adjusted under 35 U.S.C. 154(b) by 9 days.

(21) Appl. No.: 10/986,790

(22) Filed: Nov. 15, 2004

(65) Prior Publication Data

US 2005/0108871 A1    May 26, 2005

(30) Foreign Application Priority Data

Nov. 25, 2003 (IT) .................. MO2003A0320

(51) Int. Cl.
- B23P 21/00 (2006.01)
- B23P 19/00 (2006.01)
- B60B 27/00 (2006.01)

(52) U.S. Cl. ............... 29/705; 29/802; 29/709; 29/714; 29/720; 73/462; 73/468; 73/487; 301/5.21

(58) Field of Classification Search .......... 29/802, 29/705, 709, 714, 720; 73/462, 468, 487; 301/5.21, 5.22

See application file for complete search history.

(56) References Cited

U.S. PATENT DOCUMENTS

| | | | | |
|---|---|---|---|---|
| 3,623,208 A * | 11/1971 | Hofmann ............... | 29/407.08 |
| 3,636,773 A * | 1/1972 | Harant ................. | 73/466 |
| 3,748,910 A * | 7/1973 | Hofmann ............... | 73/468 |
| 4,341,119 A * | 7/1982 | Jackson et al. ........ | 73/462 |
| 4,352,291 A * | 10/1982 | Curchod et al. ........ | 73/462 |
| 4,554,734 A * | 11/1985 | Sander ................ | 29/818 |
| 4,635,481 A * | 1/1987 | Curchod ............... | 73/460 |
| 4,903,398 A * | 2/1990 | Sakamoto et al. ...... | 29/703 |
| 5,134,766 A * | 8/1992 | Miller ................ | 29/450 |
| 5,189,912 A * | 3/1993 | Quinlan et al. ........ | 73/462 |
| 5,206,984 A * | 5/1993 | Matumoto et al. ...... | 29/705 |
| 5,311,777 A * | 5/1994 | Cunningham et al. .... | 73/462 |
| 5,526,686 A * | 6/1996 | Fuchs et al. .......... | 73/462 |
| 5,557,043 A * | 9/1996 | Drechsler ............. | 73/468 |
| 5,587,528 A * | 12/1996 | Rothamel et al. ....... | 73/462 |
| 6,484,574 B1* | 11/2002 | Douglas et al. ........ | 73/462 |
| 6,595,052 B2* | 7/2003 | Wharton ............... | 73/460 |
| 6,976,385 B2* | 12/2005 | Okada et al. .......... | 73/66 |
| 6,983,656 B2* | 1/2006 | Cullum et al. ......... | 73/487 |
| 2001/0013256 A1* | 8/2001 | Ertl .................. | 74/61 |
| 2002/0000121 A1* | 1/2002 | Carter et al. ......... | 73/459 |
| 2005/0229702 A1* | 10/2005 | Haydu ................. | 73/468 |
| 2006/0016258 A1* | 1/2006 | Williams et al. ....... | 73/462 |
| 2006/0042380 A1* | 3/2006 | Douglas et al. ........ | 73/460 |

* cited by examiner

Primary Examiner—Essama Omgba
(74) Attorney, Agent, or Firm—Hoffman Wasson & Gitler

(57) ABSTRACT

A device for applying balancing weights to vehicle wheels in wheel balancing machines, comprising: a detector for the position of an indicator that can slide on rectilinear guides with respect to a wheel supported rotatable on the frame of a balancing machine; removable locking elements the indicator in at least one direction of sliding activatable when a preset position of the indicator is reached and comprising at least one first and second gears, supported rotatable on the wheel machine which mesh with each other; transmission elements for transmitting motion of the indicator to the first gear; and motion elements for moving a third gear between an inactive configuration, in which it is disengaged from the first and second gears, and a locking configuration, in which the third gear is engaged with the teeth of the first and second gears to prevent their rotation.

16 Claims, 2 Drawing Sheets

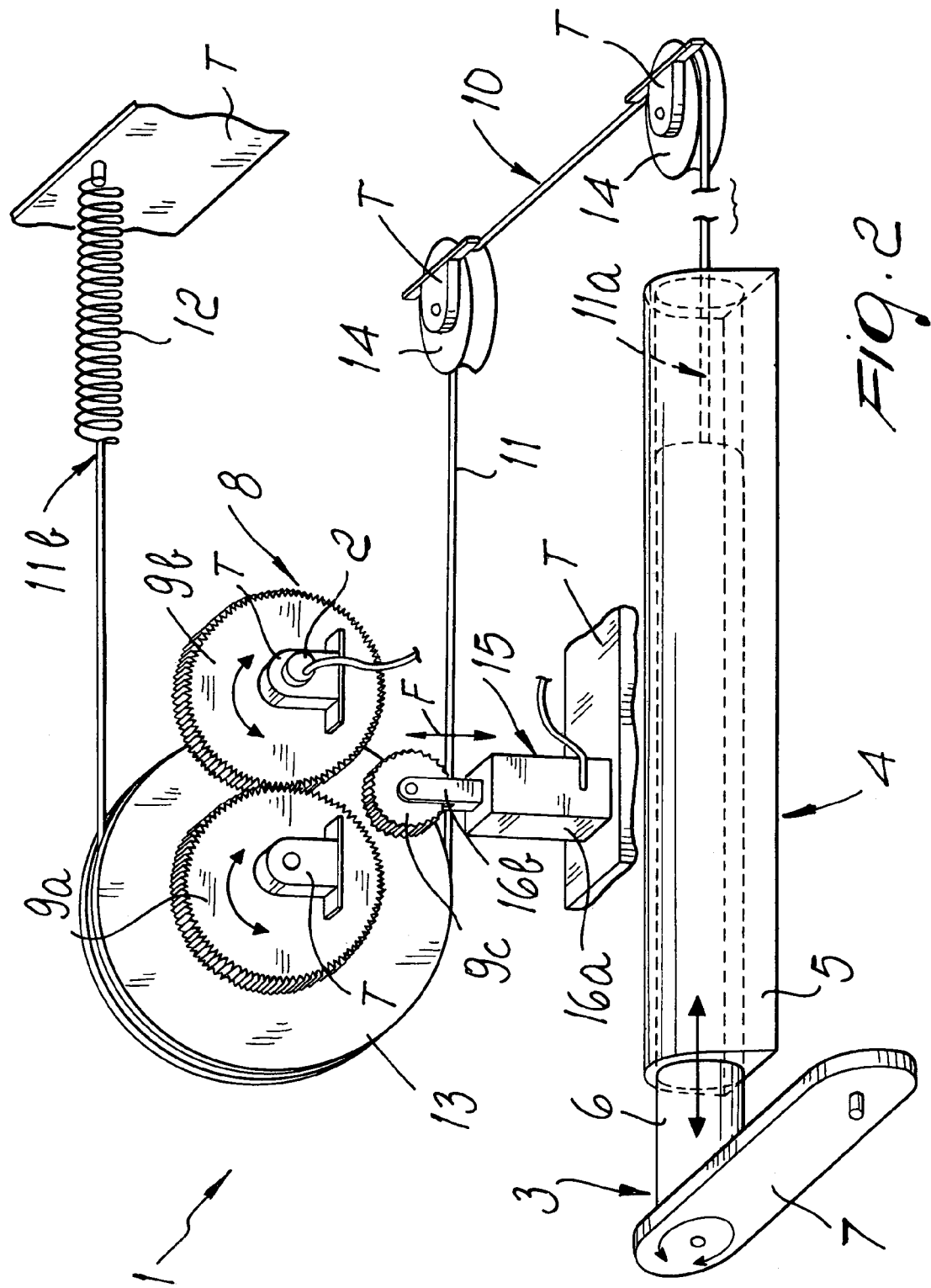

DEVICE FOR APPLYING BALANCING WEIGHTS TO VEHICLE WHEELS IN WHEEL BALANCING MACHINES

The present invention relates to a device for applying balancing weights to vehicle wheels in wheel balancing machines.

BACKGROUND OF THE INVENTION

It is known that the wheels of road vehicles often require a balancing operation, which consists in applying to the wheel rim small weights, made of lead or other material, which are suitable to compensate for the uneven distribution of the masses in the tire.

To perform this operation, it is known to use balancing machines that support the wheels to be balanced so that they can rotate about an axis, the machines being provided with electronic means that are suitable to detect any relative imbalances between the two sides of said wheels.

In particular, each balancing machine comprises rectilinear guiding means, which are parallel to the wheel rotation axis and on which an indicator element, provided with an end that acts as a reference and can be inserted in the rim, can slide.

In a first step of the balancing operation, the operator slides the indicator element until said end is alternatively arranged in two reference points chosen inside the rim, so as to define two planes that are perpendicular to the rotation axis and are conventionally termed "compensation planes".

In a second step, the electronic means of the machine, by turning the wheel, measure the imbalance with respect to the compensation planes and provide, once this measurement has been completed, the values of the weights that must be applied to the wheel at said planes.

In a third step of the balancing operation, the indicator element has to be repositioned at the two reference positions in order to allow the operator to apply the weights to the rim, for example by means of an elastic clamp, which is fitted on the indicator element at the end that acts as a reference.

To perform correct positioning of the indicator element at the positions that were preset in the first step, wheel balancing machines are provided with particular devices that are suitable to detect the current location of said element with respect to the rectilinear guiding means and automatically lock its translational motion when, during the third step, it has been returned to said preset positions.

These devices are commonly provided with rack elements and/or with toothed transmission belts, which are associated with the sliding indicator element and can be locked by means of a conventional detent mechanism, which is operated when one of the preset positions is reached.

These known types of device are not free from drawbacks, including the fact that the means used to lock the indicator element are constructively very complicated and difficult to apply to balancing machines because of their complexity.

Moreover, conventional devices are particularly expensive and bulky and generally require substantially large components, such as for example very long belts.

SUMMARY OF THE INVENTION

The aim of the present invention is to eliminate the above-noted drawbacks of the background art, by providing a device for applying balancing weights to vehicle wheels in wheel balancing machines that is particularly simple to manufacture and to fit to a balancing machine, with low manufacturing costs that do not affect significantly the overall cost of said machines.

Within this aim, an object of the present invention is to be particularly compact and small and at the same time sturdy.

Another object of the present invention is to be applicable to any type of wheel balancing machine.

Another object of the present invention is to provide a device that is simple, relatively easy to provide in practice, safe in use, effective in operation, and has a relatively low cost.

This aim and these and other objects that will become better apparent hereinafter are achieved by the present device for applying balancing weights to vehicle wheels in wheel balancing machines, which comprises means for detecting the position of an indicator element that can slide on rectilinear guiding means with respect to a vehicle wheel that is supported so that it can rotate on the frame of a wheel balancing machine, and means for the removable locking of said indicator element in at least one direction of sliding on said rectilinear guiding means, said removable locking means being activated when a preset position of said indicator element on said rectilinear guiding means is reached, characterized in that said removable locking means comprise at least one first gear and one second gear, which are supported so that they can rotate on said wheel balancing machine and mesh with each other, means for transmitting the motion of said indicator element to said first gear, and means for moving a third gear between an inactive configuration, in which said third gear is disengaged from said first and second gears, and a locking configuration, in which said third gear is simultaneously engaged with the sets of teeth of said first and second gears and is suitable to prevent their rotation.

BRIEF DESCRIPTION OF THE DRAWINGS

Further characteristics and advantages of the present invention will become better apparent from the following detailed description of a preferred but not exclusive embodiment of a device for applying balancing weights to vehicle wheels in wheel balancing machines, illustrated by way of non-limiting example in the accompanying drawings, wherein:

FIG. 2 is a schematic partial view of the device according to the invention.

DESCRIPTION OF THE PREFERRED EMBODIMENTS

Figure 1:
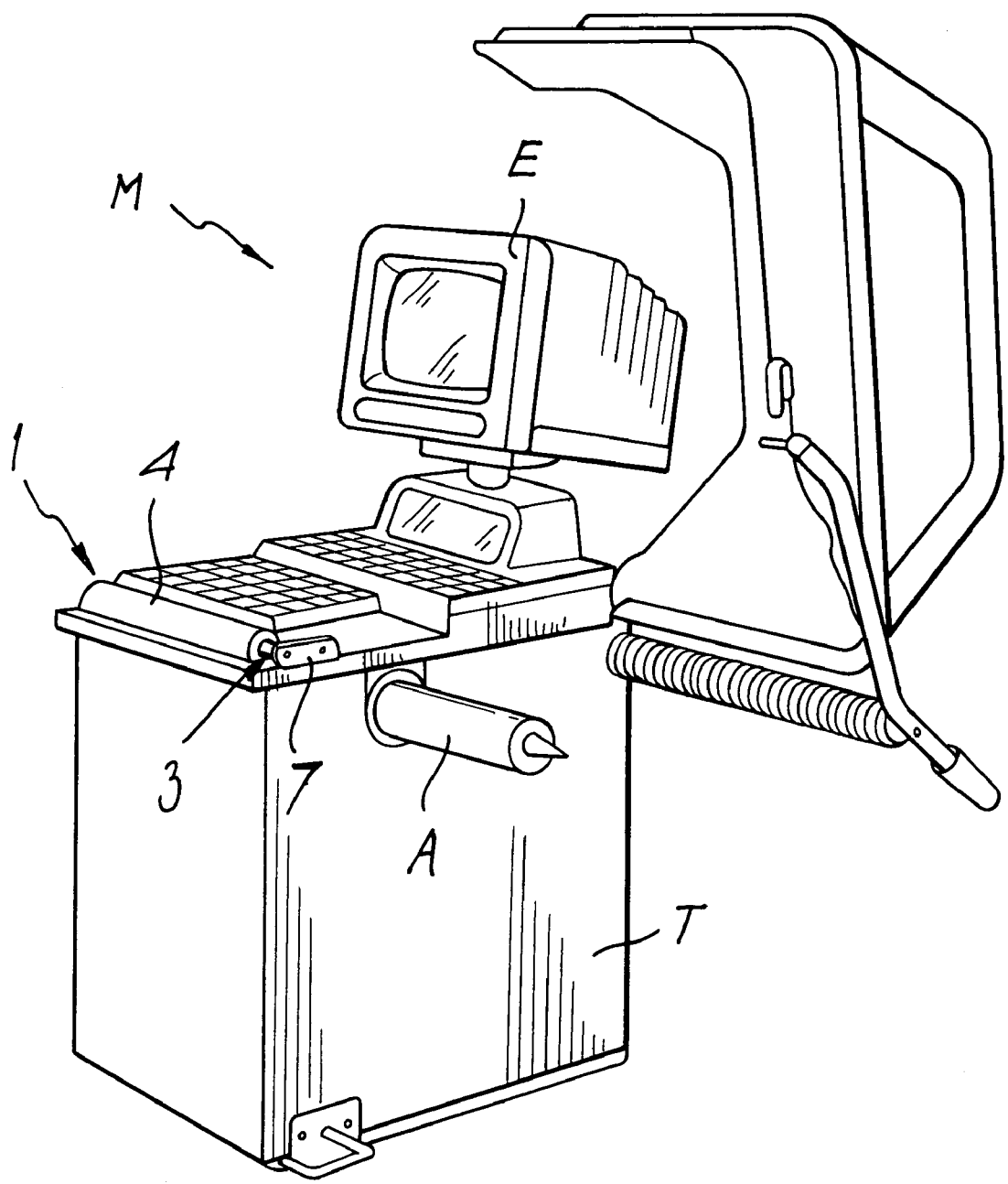
FIG. 1 is a partial perspective view of a wheel balancing machine with the device according to the invention.

With reference to the figures, the reference numeral 1 generally designates a device for applying balancing weights to vehicle wheels in wheel balancing machines.

The device 1 is fitted on a conventional wheel balancing machine M, which is provided with a shaft A on which it is possible to key a vehicle wheel, which is not shown in the figure because it is of a known type, and can be made to rotate about its own axis.

The wheel balancing machine M is provided with conventional electronic means E adapted to assess any imbalance of the wheel with respect to the rotation axis of the shaft A.

Advantageously, the device 1 comprises sensing means 2 for detecting the position, with respect to the wheel, of an indicator element 3 that can slide on rectilinear guiding means 4.

Such rectilinear guiding means are constituted by a hollow cylinder 5, which is associated with a frame T of the wheel balancing machine M; the indicator element 3 instead comprises an arm 6, which can slide telescopically inside said hollow cylinder.

In particular, the hollow cylinder 5 is parallel to the axis of the shaft A and lies at a distance from said shaft that is substantially shorter than the radius of the rim of the wheel supported on the balancing machine M, thus allowing to move the arm 6 until it lies inside said rim.

The indicator element 3 is provided with a lever 7, which is associated with the free end of the arm 6 and can rotate about the axis of the hollow cylinder 5; said lever can be provided with a clamp, not shown because it is of a known type, for applying balancing weights to the wheel rim.

Conveniently, the device 1 comprises means 8 for removably locking the sliding of the indicator element 3 on the rectilinear guiding means 4 toward the wheel; said means are such that they are activated when the indicator element reaches a preset position on said guiding means.

According to the invention, the removable locking means 8 comprise a first gear 9a and a second gear 9b, which are supported so that they can rotate on the frame T and mesh with each other; said gears have the same number of teeth, and their pitch circles are substantially identical.

Moreover, the removable locking means 8 comprise means 10 for transmitting the motion of the indicator element 3 to the first gear 9a, which are advantageously of the flexible type and comprise a flexible element constituted for example by a cable 11 or the like.

In particular, a first end 11a of said cable is associated with the arm 6, while a second end 11b, which is opposite to the first one, is connected to the frame T by interposing elastic means, such as for example a return spring 12 or the like.

The cable 11 is at least partially wound on a pulley 13, which is rigidly and coaxially associated with the first gear 9a and whose diameter is substantially larger than the diameter of the pitch circle of the first gear; the winding of the flexible element around the pulley 13, in particular, is such as to not allow relative slippage between the cable 11 and the peripheral portion of said pulley.

Advantageously, the transmission means 10 may comprise one or more pulleys 14 for guiding the cable 11, which are supported on the frame T so that they can rotate about their own axis; said guiding pulleys are suitable to flex the cable 11 while keeping it under tension, forming a path inside the balancing machine M that is free from obstacles or hindrances for the flexible element.

In this regard, it is noted that the illustration of the invention given in FIG. 2 is merely schematic; the components of the removable locking means 8 in fact may be associated with any portion of the frame T contained inside the housing of the balancing machine M and can be functionally connected to the indicator element 3 by means of the cable 11.

Further, the removable locking means 8 are provided with means 15 for moving a third gear 9c between an inactive configuration, in which it is disengaged from the first gear 9a and from the second gear 9b, and a locking configuration, in which it simultaneously engages the teeth of the first and second gears 9a and 9b, so as to prevent their rotation.

The third gear 9c in particular, has a pitch circle diameter that is substantially smaller than that of the other two gears 9a and 9b.

The movement means 15 comprise a first portion 16a, which is associated with the frame T, and a second portion 16b, which rotatably supports the third gear 9c and can move toward and away from the first and second gears 9a and 9b, in the direction indicated by the arrow F in FIG. 2.

Said first and second portions are preferably constituted by the mutually movable parts of an electromagnet.

The direction F along which the second portion 16b can move is substantially perpendicular to the plane of arrangement of the rotation axes of the first and second gears 9a and 9b.

With respect to this plane of arrangement, the electromagnet lies on the opposite side relative to the portion of the cable 11 that ends, starting from the pulley 13, with the second end 11b.

Advantageously, the sensing means 2 comprise a potentiometer, which is arranged at the rotation axis of the second gear 9b in order to detect its angular position.

Finally, the device 1 comprises a processing unit, which is provided with an input that is associated with the sensing means 2 and with an output that is associated with the removable locking means 8 and is suitable to store the preset position of the indicator element 3 on the rectilinear guiding means 4 and to actuate the movement means 15: said processing unit is preferably formed by said electronic means E suitable to evaluate the imbalance of the wheel.

In particular, in order to store the preset position, the device 1 is provided with a control switch; when said switch is operated, the processing unit acquires and stores the position sensed at the same instant by the sensing means 2.

Such control switch, not shown in the figures because it is of a known type, may be of the keypad/pedal type, which can be operated directly by the operator, or of an automatic type with a timer, in which case its activation is performed by the operator by keeping motionless, for a preset period of time, the indicator element in the position that he wishes to store.

The operation of the present invention is as follows: during the first step of the balancing operation, intended to define the so-called compensation planes, the third gear 9c is arranged in the inactive configuration, allowing the operator to move the bar 6 inside the hollow cylinder 5 by gently pushing the indicator element 3.

In the subsequent second step, during which, as mentioned, the imbalance of the wheel with respect to the compensation planes is measured, the arm 6 is left fully inserted in the hollow cylinder 5.

In the third step, assigned to the application of the balancing weights to the wheel, the repositioning of the indicator element. 3 inside the rim instead activates the movement means 15; in particular, when the preset positions are reached, the electromagnet arranges the third gear 9c in the locking configuration.

Pushing the indicator element 3 further toward the wheel, moreover, increases the stability of the locking action, since it forces the three gears 9a, 9b and 9c to mutually interlock more rigidly and firmly.

Once the weights have been positioned on the wheel, the indicator element 3 is released by the operator and retracted into the hollow cylinder 5 under the action of the return spring 12; this action of the elastic means, in particular, produces the rotation of the first and second gears 9a and 9b in the direction that produces the disengagement of the third gear 9c, which is automatically moved away from them, returning to an inactive configuration.

In practice it has been found that the described invention achieves the proposed aim and objects, and in particular the fact is stressed that it has a structure that is simple and easy to provide and also has a low cost and compact dimensions, in addition to being particularly sturdy and reliable in operation.

Moreover, the present invention can be applied universally to any type of balancing machine; it is in fact noted that the use of guiding pulleys suitable to form an obstacle-free path for the cable allows to fit the locking means on any portion of the machine, further allowing to limit its overall dimensions.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the protective scope of the appended claims.

The disclosures in Italian Patent Application No. MO2003A000320 from which this application claims priority are incorporated herein by reference.

What is claimed is:

1. A device for applying balancing weights to vehicle wheels in a wheel balancing machine provided with a frame, comprising: rectilinear guiding means supported at said frame; an indicator element that is slideable on said guiding means; sensing means for detecting position of said indicator element with respect to a vehicle wheel that is rotatably supported on said frame; and removable locking means for removable locking of said indicator element in at least one direction of sliding on said rectilinear guiding means, the removable locking means being activatable when a preset position of said indicator element on said rectilinear guiding means is reached; and wherein said removable locking means comprise: at least one first gear and one second gear, in meshing with each other, and a third gear, which are rotatably supported on said wheel balancing machine, motion transmission means for transmitting motion of said indicator element to said first gear, and movement means for moving the third gear between an inactive configuration, in which said third gear is disengaged from said first and second gears, and a locking configuration, in which said third gear is simultaneously engaged with sets of teeth of said first and second gears, said third gear being adapted to prevent rotation of said first and second gears.

2. The device of claim 1, wherein said motion transmission means are provided flexible.

3. the device of claim 1, comprising a pulley that is associated with said first gear, said motion transmission means comprising elastic means, at least one flexible element, which is associated, at a first end thereof, with said indicator element and, at a second end thereof, with said frame by interposition of said elastic means, said flexible element being at least partially wound around said pulley.

4. The device of claim 3, wherein said flexible element comprises at least one cable.

5. The device of claim 3, wherein said elastic means is a spring.

6. The device of claim 3, wherein said pulley and said first gear are rigidly and coaxially connected to each other.

7. The device of claim 6, wherein said pulley and first gear are provided with a diameter of the pulley being substantially greater than a diameter of a pitch circle of the first gear.

8. The device of claim 7, wherein diameters of pitch circles of said first and second gears are substantially identical.

9. The device of claim 7, wherein a diameter of the pitch circle of said third gear is substantially smaller than at least one of the diameters of the pitch circles of said first and second gears.

10. The device of claim 3, wherein said motion transmission means comprises at last one guiding pulley for said flexible element, which is rotatably supported on said frame.

11. The device of claim 1, wherein said sensing means comprises at least one potentiometer.

12. The device of claim 11, wherein said potentiometer is arranged at an axis of said second gear and is adapted to detect angular position thereof.

13. The device of claim 1, wherein said movement means comprises at least one first portion, which is associated with said frame, and at least one second portion, which supports said third gear, said second portion being movable toward and away from said first and second gears along an approach and spacing direction.

14. The device of claim 13, wherein said approach and spacing direction is substantially perpendicular to a plane of arrangement of rotation axes of said first and second gears.

15. The device of claim 13, wherein said first and second portions are formed by two parts of an electromagnet that are movable with respect to each other.

16. The device of claim 1, comprising a processing unit, which is provided with at least one input thereof associated with said sensing means and with at least one output thereof, associated with said removable locking means, said processing unit being adapted to store said preset position and actuate said movement means.

* * * * *